Patented Feb. 20, 1940

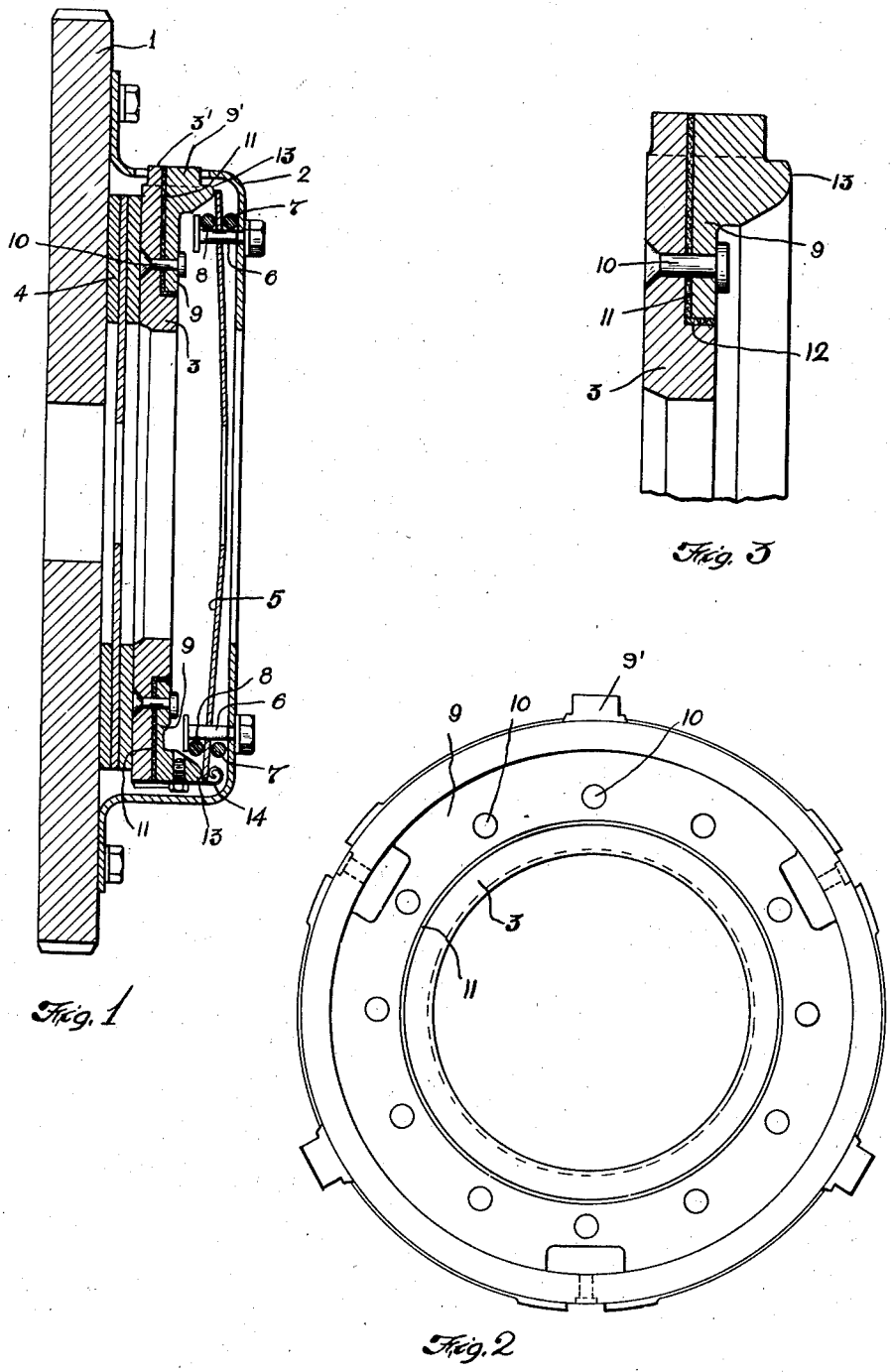

2,190,874

UNITED STATES PATENT OFFICE 2,190,874

CLUTCH PRESSURE PLATE

George T. Jarrett, East Cleveland, Ohio, assignor to Ira Saks

Application August 16, 1938, Serial No. 225,134

2 Claims. (Cl. 192—113)

The present invention relates to an improvement in the driving member of a friction clutch assembly. More particularly, it has to do with the driving member more commonly known as the pressure plate. A clutch pressure plate is the element, which, by means of engagement by pressure springs and operating levers, is moved in an axial direction toward and away from the other driving member, namely, the fly wheel, in order to effect engagement and disengagement with the driven element, i. e., the clutch plate. Such frictional engagement of the pressure plate with the clutch plate of course produces a substantial amount of heat of friction, which on transmission through the pressure plate has a deleterious effect upon the actuating elements such as the pressure springs and the operating levers.

It is therefore the general object and nature of my invention to provide an isolated and insulated portion for a clutch pressure plate, such portion being located on the side opposite to the friction engaging surface of the pressure plate and adapted to be contacted by the pressure springs and/or operating levers. My invention is particularly beneficial where operating levers of relatively thin cross-section, such as levers formed of stamped metal, are used; or where the pressure springs and operating levers are combined into the form of a single element as in the "Belleville spring" type of pressure plate actuating element.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing—

Fig. 1 is a sectional view of a clutch assembly and illustrating a pressure plate embodying the principle of my invention; Fig. 2 is a plan view of the right hand or rear face of the pressure plate; and Fig. 3 is an enlarged sectional view of the pressure plate.

Now referring more particularly to the drawing, there is shown therein a driving member consisting of the fly wheel 1, which carries the clutch housing or cover plate 2. The other driving member 3 is drivably connected to the cover plate 2 by means of the driving lugs 3' engaging with slots therein. The friction clutch plate 4 is positioned between the fly wheel 1 and the pressure plate 3.

The movement of the pressure plate 3 into and out of engagement with the clutch plate 4 is controlled by means of the Belleville spring 5 which functions both as a lever and spring element. The Belleville spring 5 is fulcrumed upon the pivot rings 7 and 8 which are held in position with respect to the cover plate 2 by means of the retaining bolts 6.

The portion 9 of the pressure plate 3 is fastened thereto by means of the rivets 10 and spaced and insulated therefrom by means of the layer of insulating material 11. A shoulder 12 is provided on the pressure plate 3 and serves as means for further aiding in the positioning of the separated portion 9 on the pressure plate 3. The portion 9 has a lip 13 which is adapted to be contacted by the outer edge of the Belleville spring 5, and this edge is in turn held against the lip 13 by means of the retaining spring clips 14. It will thus be seen that the operating element contacting portion 9 of the pressure plate 3 is separated and insulated from the body of the pressure plate, so that the heat of friction generated by the frictional contact of the engaging surface of the pressure plate 3 is not transmitted to the operating element 5, thus preventing the drawing of the temper and weakening of the latter.

The portion 9 also has driving lugs 9' adapted to engage with the slots in the cover plate 2. The lugs 9' are of course in radial alignment with the driving lugs 3' and form a continuation thereof.

It should be apparent to those skilled in the art, from the foregoing description, that the principle of my invention is equally well applicable to other forms of clutch assemblies wherein the actuating elements such as operating levers and pressure springs are not combined in a single element such as the Belleville spring 5, but are in the form of individual elements.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A multi-part clutch pressure plate consisting of a friction surface-engaging portion and an operating lever contact portion, both of said portions being so shaped and assembled as to form a normally complete pressure plate and including driving lug projections on the outer periphery of said portions, said projections being in registry with each other, a layer of insulating material separating said portions, and fastening means passing through both of said portions.

2. A mutli-part clutch pressure plate consisting of a friction surface-engaging portion and an operating lever contact portion, both of said portions being so shaped and assembled as to form a normally complete pressure plate and including driving lug projections being in registry with each other, said contact portion extending from the outer periphery of said engaging portion, centrally inwardly to a point short of the inner marginal edge of the latter, an annular shoulder on said engaging portion adjacent such inner edge of said contact portion, a layer of insulating material separating said portions, and fastening means passing through both of said portions.

GEORGE T. JARRETT.